(12) United States Patent
Pickard

(10) Patent No.: US 8,556,469 B2
(45) Date of Patent: Oct. 15, 2013

(54) HIGH EFFICIENCY TOTAL INTERNAL REFLECTION OPTIC FOR SOLID STATE LIGHTING LUMINAIRES

(75) Inventor: Paul Kenneth Pickard, Morrisville, NC (US)

(73) Assignee: Cree, Inc., Durham, NC (US)

( * ) Notice: Subject to any disclaimer, the term of this patent is extended or adjusted under 35 U.S.C. 154(b) by 336 days.

(21) Appl. No.: 12/961,380

(22) Filed: Dec. 6, 2010

(65) Prior Publication Data

US 2012/0140462 A1   Jun. 7, 2012

(51) Int. Cl.
F21V 33/00   (2006.01)
(52) U.S. Cl.
USPC ........................................ 362/311.02
(58) Field of Classification Search
USPC ........................................ 362/311.02
See application file for complete search history.

(56) References Cited

U.S. PATENT DOCUMENTS

| | | | |
|---|---|---|---|
| 1,880,399 A | 10/1932 | Benjamin | |
| 4,120,026 A | 10/1978 | Tsuchihashi et al. | |
| 4,710,699 A | 12/1987 | Miyamoto | |
| 4,946,547 A | 8/1990 | Palmour et al. | 156/643 |
| 5,200,022 A | 4/1993 | Kong et al. | 156/612 |
| 5,477,436 A | 12/1995 | Bertling et al. | |
| 5,851,063 A | 12/1998 | Doughty et al. | |
| 5,962,971 A | 10/1999 | Chen | |
| 5,998,925 A | 12/1999 | Shimizu et al. | |
| 6,066,861 A | 5/2000 | Hohn et al. | |
| 6,069,440 A | 5/2000 | Shimizu et al. | |
| 6,084,250 A | 7/2000 | Justel et al. | |
| 6,132,072 A | 10/2000 | Turnbull et al. | |
| 6,153,971 A | 11/2000 | Shimizu | |
| 6,163,038 A | 12/2000 | Chen et al. | |
| 6,212,213 B1 | 4/2001 | Weber et al. | |
| 6,234,648 B1 | 5/2001 | Borner et al. | |
| 6,245,259 B1 | 6/2001 | Hohn et al. | |
| 6,252,254 B1 | 6/2001 | Soules et al. | |

(Continued)

FOREIGN PATENT DOCUMENTS

| | | |
|---|---|---|
| DE | 39 16 875 | 12/1990 |
| DE | 42 28 895 | 3/1994 |

(Continued)

OTHER PUBLICATIONS

International Search Report and Written Opinion from PCT/US2011/062444, dated Apr. 19, 2012.

(Continued)

Primary Examiner — Laura Tso
(74) Attorney, Agent, or Firm — Koppel, Patrick, Heybl & Philpott

(57) ABSTRACT

Optical elements having components made from high refractive index materials (RI≤1.6) and lamp assemblies incorporating such elements. Various optical elements, such as total internal reflection lenses, can be fabricated from materials having a higher index of refraction than materials typically used in such elements. The compact optical elements have at least one internal reflection surface that directs radiant energy (e.g., light) from a receiving end to a transmitting end. By using a high refractive index material, a lens can be fabricated that directs a greater portion of the light emitted from a source into the lens toward the transmitting end of the lens. Thus, less of the light spills out of the lens at a surface where emission is not intended, reducing the number of lossy bounces needed to direct the light in a particular direction.

51 Claims, 3 Drawing Sheets

(56) References Cited

U.S. PATENT DOCUMENTS

| | | |
|---|---|---|
| 6,255,670 B1 | 7/2001 | Srivastava et al. |
| 6,294,800 B1 | 9/2001 | Duggal et al. |
| 6,319,425 B1 | 11/2001 | Tasaki et al. |
| 6,337,536 B1 | 1/2002 | Matsubara et al. |
| 6,373,188 B1 | 4/2002 | Johnson et al. |
| 6,396,081 B1 | 5/2002 | Tews et al. |
| 6,429,583 B1 | 8/2002 | Levinson et al. |
| 6,441,558 B1 | 8/2002 | Muthu et al. |
| 6,469,322 B1 | 10/2002 | Srivastava et al. |
| 6,480,299 B1 | 11/2002 | Drakopoulos et al. |
| 6,501,100 B1 | 12/2002 | Srivastava et al. |
| 6,501,102 B2 | 12/2002 | Mueller-Mach et al. |
| 6,504,179 B1 | 1/2003 | Ellens et al. |
| 6,504,301 B1 | 1/2003 | Lowery |
| 6,509,651 B1 | 1/2003 | Matsubara et al. |
| 6,513,949 B1 | 2/2003 | Marshall et al. |
| 6,538,371 B1 | 3/2003 | Duggal et al. |
| 6,547,249 B2 | 4/2003 | Collins, III et al. |
| 6,550,949 B1 | 4/2003 | Bauer et al. |
| 6,552,495 B1 | 4/2003 | Chang |
| 6,576,930 B2 | 6/2003 | Reeh et al. |
| 6,577,073 B2 | 6/2003 | Shimizu et al. |
| 6,582,103 B1 * | 6/2003 | Popovich et al. .............. 362/307 |
| 6,600,175 B1 | 7/2003 | Baretz et al. |
| 6,600,324 B2 | 7/2003 | St. Germain |
| 6,608,332 B2 | 8/2003 | Shimizu et al. |
| 6,614,179 B1 | 9/2003 | Shimizu et al. |
| 6,616,862 B2 | 9/2003 | Srivastava et al. |
| 6,624,638 B2 | 9/2003 | St. Germain |
| 6,635,503 B2 | 10/2003 | Andrews et al. |
| 6,636,003 B2 | 10/2003 | Rahm et al. |
| 6,642,666 B1 | 11/2003 | St. Germain |
| 6,657,236 B1 | 12/2003 | Thibeault et al. ............... 257/98 |
| 6,685,852 B2 | 2/2004 | Setlur et al. |
| 6,692,136 B2 | 2/2004 | Marshall et al. |
| 6,703,173 B2 | 3/2004 | Lu et al. |
| 6,737,801 B2 | 5/2004 | Ragle |
| 6,744,194 B2 | 6/2004 | Fukasawa et al. |
| 6,762,563 B2 | 7/2004 | St. Germain et al. |
| 6,784,463 B2 | 8/2004 | Camras et al. |
| 6,817,735 B2 | 11/2004 | Shimizu et al. |
| 6,841,804 B1 | 1/2005 | Chen et al. |
| 6,853,010 B2 | 2/2005 | Slater, Jr. et al. |
| 6,882,101 B2 | 4/2005 | Ragle |
| 6,885,035 B2 | 4/2005 | Bhat et al. |
| 6,914,267 B2 | 7/2005 | Fukasawa et al. |
| 6,936,857 B2 | 8/2005 | Doxsee et al. |
| 6,957,899 B2 | 10/2005 | Jiang et al. |
| 6,967,116 B2 | 11/2005 | Negley |
| 7,005,679 B2 | 2/2006 | Tarsa et al. |
| 7,008,078 B2 | 3/2006 | Shimizu et al. |
| 7,009,199 B2 | 3/2006 | Hall |
| 7,009,343 B2 | 3/2006 | Lim et al. |
| 7,014,336 B1 | 3/2006 | Ducharme et al. |
| 7,023,019 B2 | 4/2006 | Maeda et al. |
| 7,095,056 B2 | 8/2006 | Vitta et al. |
| 7,125,143 B2 | 10/2006 | Hacker |
| 7,135,664 B2 | 11/2006 | Vornsand et al. |
| 7,141,442 B2 | 11/2006 | Sano |
| 7,213,940 B1 | 5/2007 | Van de Ven et al. .......... 362/231 |
| 7,213,942 B2 | 5/2007 | Jiang et al. |
| 7,217,583 B2 | 5/2007 | Negley et al. |
| 7,221,044 B2 | 5/2007 | Fan et al. |
| 7,222,995 B1 | 5/2007 | Bayat et al. |
| 7,250,715 B2 | 7/2007 | Mueller et al. |
| 7,256,557 B2 | 8/2007 | Lim et al. |
| 7,263,583 B2 | 8/2007 | Radkov |
| 7,278,760 B2 | 10/2007 | Heuser et al. |
| 7,358,954 B2 | 4/2008 | Negley et al. |
| 7,365,485 B2 | 4/2008 | Fukasawa et al. |
| 7,387,405 B2 | 6/2008 | Dutcharme et al. |
| 7,417,259 B2 | 8/2008 | Sakai et al. |
| 7,422,504 B2 | 9/2008 | Maeda et al. |
| 7,453,195 B2 | 11/2008 | Radkov |
| 7,473,934 B2 | 1/2009 | Nagal et al. |
| 7,573,074 B2 | 8/2009 | Shum et al. ..................... 257/99 |
| 7,795,623 B2 | 9/2010 | Emerson et al. ................. 257/79 |
| 7,821,023 B2 | 10/2010 | Yuan et al. ...................... 257/98 |
| 7,915,629 B2 | 3/2011 | Ibbetson et al. ................ 257/98 |
| 2003/0030063 A1 | 2/2003 | Sosniak et al. |
| 2003/0042908 A1 | 3/2003 | St. Germain |
| 2003/0089918 A1 | 5/2003 | Hiller et al. |
| 2004/0046178 A1 | 3/2004 | Sano |
| 2004/0105264 A1 | 6/2004 | Spero |
| 2004/0264193 A1 | 12/2004 | Okumura |
| 2005/0030744 A1 | 2/2005 | Ducharme et al. |
| 2005/0242358 A1 | 11/2005 | Tu et al. |
| 2006/0012989 A1 | 1/2006 | Lee |
| 2006/0022582 A1 | 2/2006 | Radkov |
| 2006/0060874 A1 | 3/2006 | Edmond et al. ................ 257/98 |
| 2006/0105482 A1 | 5/2006 | Alferink et al. |
| 2006/0113548 A1 | 6/2006 | Chen et al. |
| 2006/0138435 A1 | 6/2006 | Tarsa et al. |
| 2006/0181192 A1 | 8/2006 | Radkov et al. |
| 2006/0245184 A1 | 11/2006 | Galli |
| 2007/0001188 A1 | 1/2007 | Lee |
| 2007/0051966 A1 | 3/2007 | Hagashi et al. |
| 2007/0090381 A1 | 4/2007 | Otsuka et al. |
| 2007/0139920 A1 | 6/2007 | Van De Ven et al. |
| 2007/0139923 A1 | 6/2007 | Negley et al. |
| 2007/0158668 A1 | 7/2007 | Tarsa et al. ..................... 257/79 |
| 2007/0170447 A1 | 7/2007 | Negley et al. |
| 2007/0171145 A1 | 7/2007 | Coleman et al. |
| 2007/0202623 A1 | 8/2007 | Gao et al. |
| 2007/0223219 A1 | 9/2007 | Medendorp, Jr. et al. |
| 2007/0236911 A1 | 10/2007 | Negley |
| 2007/0263393 A1 | 11/2007 | Van De Ven |
| 2007/0267983 A1 | 11/2007 | Van De Ven et al. |
| 2007/0274063 A1 | 11/2007 | Negley |
| 2007/0274080 A1 | 11/2007 | Negley et al. |
| 2007/0276606 A1 | 11/2007 | Radkov et al. |
| 2007/0278503 A1 | 12/2007 | Van De Ven et al. |
| 2007/0278934 A1 | 12/2007 | Van De Ven et al. |
| 2007/0279440 A1 | 12/2007 | Negley |
| 2007/0279903 A1 | 12/2007 | Negley et al. |
| 2007/0280624 A1 | 12/2007 | Negley et al. |
| 2008/0048553 A1 * | 2/2008 | Destain et al. ................. 313/499 |
| 2008/0084685 A1 | 4/2008 | Van De Ven et al. |
| 2008/0084700 A1 | 4/2008 | Van De Ven |
| 2008/0084701 A1 | 4/2008 | Van De Ven et al. |
| 2008/0088248 A1 | 4/2008 | Myers |
| 2008/0089053 A1 | 4/2008 | Negley |
| 2008/0106895 A1 | 5/2008 | Van de Ven et al. |
| 2008/0106907 A1 | 5/2008 | Trott et al. |
| 2008/0112168 A1 | 5/2008 | Pickard |
| 2008/0112170 A1 | 5/2008 | Trott et al. |
| 2008/0112183 A1 | 5/2008 | Negley |
| 2008/0130265 A1 | 6/2008 | Negley et al. |
| 2008/0130285 A1 | 6/2008 | Negley et al. |
| 2008/0130298 A1 | 6/2008 | Negley et al. |
| 2008/0136313 A1 | 6/2008 | Van De Ven et al. |
| 2008/0137347 A1 | 6/2008 | Trott et al. |
| 2008/0173884 A1 | 7/2008 | Chitnis et al. .................... 438/22 |
| 2008/0179602 A1 | 7/2008 | Negley et al. |
| 2008/0179611 A1 | 7/2008 | Chitnis et al. ................... 257/98 |
| 2008/0211416 A1 | 9/2008 | Negley et al. |
| 2008/0259589 A1 | 10/2008 | Van De Ven |
| 2008/0278928 A1 | 11/2008 | Van De Ven et al. |
| 2008/0278940 A1 | 11/2008 | Van De Ven et al. |
| 2008/0278950 A1 | 11/2008 | Pickard et al. |
| 2008/0278952 A1 | 11/2008 | Trott et al. |
| 2008/0283861 A1 * | 11/2008 | Loh et al. ........................ 257/98 |
| 2008/0304260 A1 | 12/2008 | Van De Ven et al. |
| 2008/0304261 A1 | 12/2008 | Van De Ven et al. |
| 2008/0304269 A1 | 12/2008 | Pickard et al. |
| 2008/0309255 A1 | 12/2008 | Myers et al. |
| 2008/0310154 A1 | 12/2008 | Van De Ven et al. |
| 2008/0310158 A1 | 12/2008 | Harbers et al. ................. 362/294 |
| 2009/0050907 A1 | 2/2009 | Yuan et al. |
| 2009/0050908 A1 | 2/2009 | Yuan et al. ...................... 257/88 |
| 2009/0108269 A1 | 4/2009 | Negley et al. |
| 2009/0109687 A1 * | 4/2009 | Householder et al. ......... 362/309 |
| 2009/0121241 A1 | 5/2009 | Keller et al. ..................... 257/94 |
| 2009/0152583 A1 | 6/2009 | Chen et al. ...................... 257/98 |

(56) References Cited

U.S. PATENT DOCUMENTS

| | | | |
|---|---|---|---|
| 2009/0160363 A1 | 6/2009 | Negley et al. | |
| 2009/0161356 A1 | 6/2009 | Negley et al. | |
| 2009/0184616 A1 | 7/2009 | Van De Ven et al. | |
| 2009/0184666 A1 | 7/2009 | Myers et al. | |
| 2009/0231856 A1 | 9/2009 | Householder | |
| 2009/0246895 A1 | 10/2009 | You et al. | |
| 2009/0283779 A1 | 11/2009 | Negley et al. | 257/88 |
| 2009/0283787 A1 | 11/2009 | Donofrio et al. | |
| 2010/0079872 A1* | 4/2010 | Destain | 359/641 |
| 2010/0097809 A1 | 4/2010 | Munro et al. | |
| 2010/0140636 A1 | 6/2010 | Donofrio et al. | 257/98 |
| 2010/0155746 A1 | 6/2010 | Ibbetson et al. | |
| 2010/0226127 A1* | 9/2010 | Bigliatti et al. | 362/235 |
| 2010/0252848 A1 | 10/2010 | Ibbetson et al. | |
| 2011/0049546 A1 | 3/2011 | Heikman et al. | 257/98 |

FOREIGN PATENT DOCUMENTS

| | | |
|---|---|---|
| DE | 103 35 077 | 3/2005 |
| EP | 0 838 866 A2 | 4/1998 |
| EP | 0 971 421 A2 | 1/2000 |
| EP | 1 024 399 A1 | 8/2000 |
| EP | 1 160 883 A2 | 12/2001 |
| EP | 1 193 772 A2 | 4/2002 |
| EP | 1 367 655 A1 | 12/2003 |
| EP | 1 462 711 A1 | 12/2004 |
| EP | 1 566 848 A2 | 8/2005 |
| EP | 1 571 715 A1 | 9/2005 |
| EP | 1 760 795 A2 | 3/2007 |
| EP | 1 850 383 A1 | 10/2007 |
| JP | 10-163535 | 6/1998 |
| JP | 2000-183408 | 6/2000 |
| JP | 2000-294834 | 10/2000 |
| JP | 2001 156331 | 6/2001 |
| JP | 2001/307506 | 11/2001 |
| JP | 2002-150821 | 5/2002 |
| JP | 2003-515956 | 5/2003 |
| JP | 2003-529889 | 10/2003 |
| JP | 2004-080046 | 3/2004 |
| JP | 2004-103443 | 4/2004 |
| JP | 2004-253309 | 9/2004 |
| JP | 2004-356116 | 12/2004 |
| JP | 2004-363055 | 12/2004 |
| JP | 2005-142311 | 6/2005 |
| JP | 2007-122950 | 5/2007 |
| JP | 2007-141737 | 6/2007 |
| WO | WO 00/19546 | 4/2000 |
| WO | WO 01/41215 | 6/2001 |
| WO | WO 02/054503 | 7/2002 |
| WO | WO 2005/004202 A2 | 1/2005 |
| WO | WO 2005/013365 A2 | 2/2005 |
| WO | WO 2005/022030 | 3/2005 |
| WO | WO2005066539 A1 | 7/2005 |
| WO | WO2005078338 A1 | 8/2005 |
| WO | WO 2005/124877 | 12/2005 |
| WO | WO2005117152 | 12/2005 |
| WO | WO 2006/003559 | 1/2006 |
| WO | WO 2006/028312 A1 | 3/2006 |
| WO | WO 2006/061728 A2 | 6/2006 |
| WO | WO2006092697 A1 | 9/2006 |
| WO | WO2009056927 A1 | 5/2009 |

OTHER PUBLICATIONS

Kasarova, et al. "Analysis of the dispersion of optical plastic materials", Optical Materials 29 (2007), pp. 1481-1490.
US RE34,681, 2/1995, Davis et al. (withdrawn).
C.H. Lin et al., "Enhancement of InGaN-GaN Indium-Tin-Oxide Flip-Chip Light-Emitting Diodes with TiO2-SiO2 Multilayer Stack Omnidirectional Reflector," IEEE Photonics Technology Letters, vol. 18, No. 19, Oct. 1, 2006, pp. 2050-2052.
Windisch et al. "Impact of Texture-Enhanced Transmission on High-Efficiency Surface-Textured Light-Emitting Diodes," Applied Physics Letters, vol. 79, No. 15, Oct. 2001, pp. 2315-2317.
Schnitzer et al. "30% External Quantum Efficiency From Surface Textured, Thin-Film Light-Emitting Diodes," Applied Physics Letters, Oct. 18, 1993, vol. 64, No. 16, pp. 2174-2176.
Windisch et al. "Light-Extraction Mechanisms in High-Efficiency Surface-Textured Light-Emitting Diodes," IEEE Journal on Selected Topics in Quantum Electronics, vol. 8, No. 2, Mar./Apr. 2002, pp. 248-255.
Streubel, et al. "High Brightness AlGaInP Light-Emitting Diodes," IEEE Journal on Selected Topics In Quantum Electronics, vol. 8, No. 2, Mar./Apr. 2002, pp. 321-332.
Cree EZ400 LED Data Sheet, 2007 Cree's EZBright LEDs.
Cree EZ700 LED Data Sheet, 2007 Cree's EZBright LEDs.
Cree EZ1000 LED Data Sheet, 2007 Cree's EZBright LEDs.
Cree EZBright290 LED Data Sheet, 2007 Cree's EZBright LEDs.
International Search Report and Written Opinion for counterpart Application No. PCT/US2009/066938 mailed Aug. 30, 2010.
High-Performance GaN-Based Vertical-Injection Light-Emitting Diodes with TiO2-SiO2 Omnidirectional Reflector and n-GaN Roughness, H.W. Huang, IEEE Photonics Technology Letters vol. 19 No. 8, Apr. 15, 2007.
International Search Report and Written Opinion for counterpart PCT Appl. No. PCT/US2010/002827, mailed May 2, 2011.
Related U.S. Appl. No. 12/154,691, filed May 23, 2008.
Related U.S. Appl. No. 12/156,995, filed Jun. 5, 2008.
Related U.S. Appl. No. 12/475,261, filed May 29, 2009.
Cree's LR6, LR24 and LR4 data sheets, dated Jul. 23, 2010, www.cree.com.
Cree's XLamp® MP-L EasyWhite™ LED, dated Jun. 1, 2010, www.cree.com/products/xlamp.
U.S. Appl. No. 11/947,323, filed Nov. 29, 2007.
Rosco, Inc. Permacolor data sheet, © 2001, #1013 Goldenrod.
Rosco, Inc. Permacolor data sheet, © 2001, #3409 ¼ CTO.
U.S. Appl. No. 60/792,859, filed Apr. 18, 2006, Van De Ven.
U.S. Appl. No. 60/793,524, filed Apr. 20, 2006, Van De Ven.
U.S. Appl. No. 60/868,134, filed Dec. 1, 2006, Van De Ven.
U.S. Appl. No. 60/978,880, filed Oct. 10, 2007, Van De Ven.
U.S. Appl. No. 60/990,435, filed Nov. 27, 2007, Van De Ven.
U.S. Appl. No. 60/990,439, filed Nov. 27, 2007, Negley.
U.S. Appl. No. 60/990,724, filed Nov. 28, 2007, Negley.
U.S. Appl. No. 61/022,886, filed Jan. 23, 2008, Myers.
U.S. Appl. No. 61/037,365, filed Mar. 18, 2008, Van De Ven.
U.S. Appl. No. 61/039,926, filed Mar. 27, 2008, Myers.
U.S. Appl. No. 61/041,404, filed Apr. 1, 2008, Negley.
U.S. Appl. No. 61/075,513, filed Jun. 25, 2008, Roberts.
"Cree XLamp XR-E and XR-C LED Binning and Labeling", pp. 1-15, Copyright 2007-2008 Cree, Inc. Application Note: CLD-AP12.008.
Cree® XLamp® 7090 XR-E Series LED Binning and Labeling.
International Search Report and Written Opinion corresponding to International Application No. PCT/US2007/009462; Mailing Date: Oct. 24, 2008.
International Search Report and Written Opinion corresponding to International Application No. PCT/US2007/009459; Mailing Date: Mar. 3, 2008.
International Search Report and Written Opinion corresponding to International Application No. PCT/US2008/054665; Mailing Date: Jul. 16, 2008.
International Search Report and Written Opinion corresponding to International Application No. PCT/US2007/086593; Mailing Date: Apr. 18, 2008.
International Search Report and Written Opinion corresponding to International Application No. PCT/US2006/048654; Mailing Date: Feb. 13, 2008.
International Search Report and Written Opinion corresponding to International Application No. PCT/US2008/063042; Mailing Date: Jul. 21, 2008.
International Search Report and Written Opinion corresponding to International Application No. PCT/US2007/086027; Mailing Date: Apr. 25, 2008.
International Search Report and Written Opinion corresponding to International Application No. PCT/US2008/063021; Mailing Date: Aug. 5, 2008.

(56) References Cited

OTHER PUBLICATIONS

International Search Report and Written Opinion corresponding to International Application No. PCT/US2008/051633; Mailing Date: Aug. 14, 2008.

International Search Report and Written Opinion corresponding to International Application No. PCT/US2008/063016; Mailing Date: Aug. 5, 2008.

International Search Report and Written Opinion corresponding to International Application No. PCT/US2008/063027; Mailing Date: Jul. 23, 2008.

International Search Report and Written Opinion corresponding to International Application No. PCT/US2007/09629; Mailing Date: Feb. 11, 2008.

International Search Report and Written Opinion corresponding to International Application No. PCT/US2008/079299; Mailing Date: Jan. 9, 2009.

International Search Report and Written Opinion corresponding to International Application No. PCT/US2008/063020; Mailing Date: Jul. 21, 2008.

International Search Report and Written Opinion corresponding to International Application No. PCT/US2009/003768; Mailing Date: Sep. 24, 2009.

Krames, "Lumileds Lighting, Light from Silicon Valley" Progress and Future Direction of LED Technology, SSL Workshop, Nov. 13, 2003, pp. 1-21.

"LED Binning" Cree LED Light, pp. 1-12 (2007).

Mirhosseini, et al. "Improved Color Rendering and Luminous Efficacy in Phosphor-Converted White Light-Emitting Diodes by Use of Dual-Blue Emitting Active Regions" Optical Society of America 17(13):10806-10813 (2009).

Ohno, "Simulation Analysis of White LED Spectra and Color Rendering" National Institute of Standards and Technology, USA, pp. 1-4.

"Specifications for the Chromaticity of Solid State Lighting Products" American National Standard Lighting Group, ANSI_NEMA_ ANSLG C78.377-2008, pp. 1-17 (Jan. 9, 2008).

Van de Ven et al., "Warm White Illumination with High CRI and High Efficacy by Combining 455 nm Excited Yellowish Phosphor LEDs and Red AlInGaP LEDs", First International Conference on White LEDs and Solid State Lighting.

\* cited by examiner

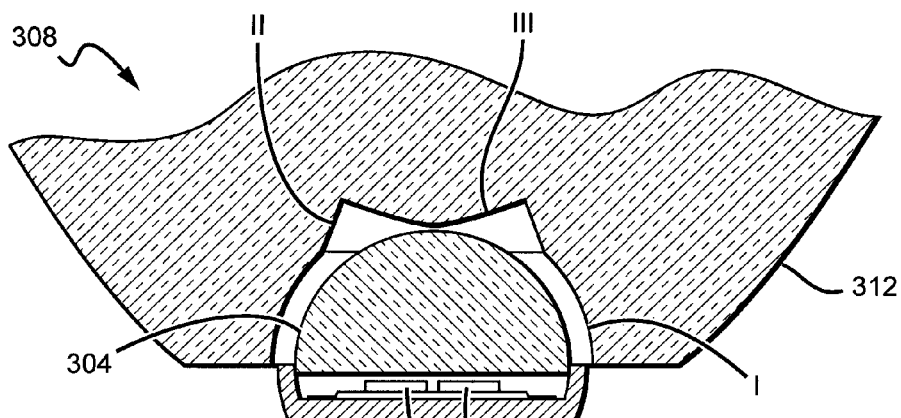
FIG. 4
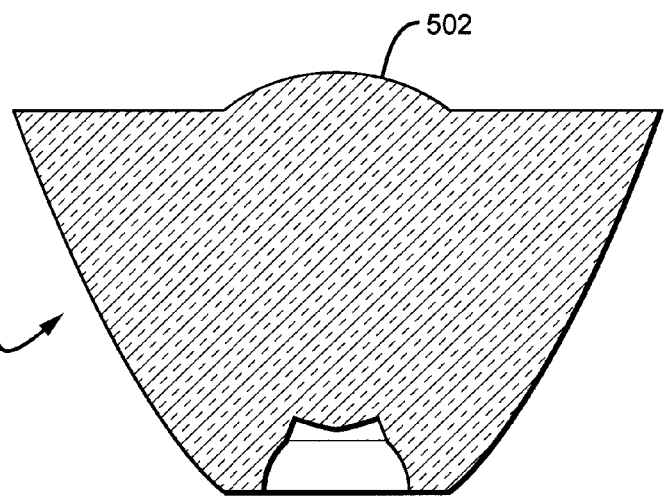
FIG. 5
FIG. 6
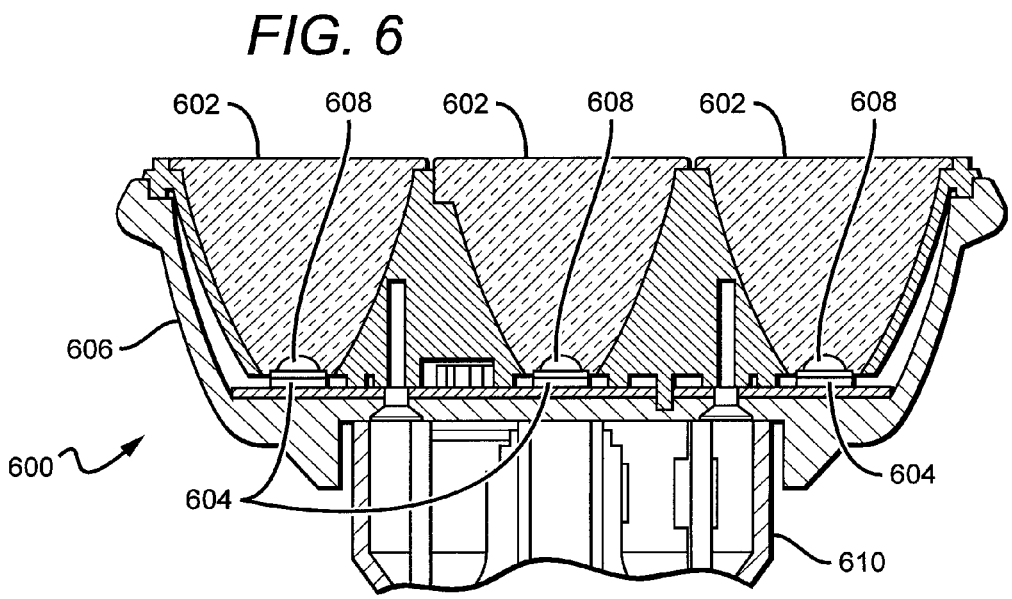

HIGH EFFICIENCY TOTAL INTERNAL REFLECTION OPTIC FOR SOLID STATE LIGHTING LUMINAIRES

BACKGROUND OF THE INVENTION

1. Field of the Invention

The invention relates generally to optical assemblies for lighting applications and, more particularly, to optical assemblies for solid state light sources.

2. Description of the Related Art

Light emitting diodes (LED or LEDs) are solid state devices that convert electric energy to light, and generally comprise one or more active regions of semiconductor material interposed between oppositely doped semiconductor layers. When a bias is applied across the doped layers, holes and electrons are injected into the active region where they recombine to generate light. Light is emitted from the active region and from surfaces of the LED.

In order to generate a desired output color, it is sometimes necessary to mix colors of light which are more easily produced using common semiconductor systems. Of particular interest is the generation of white light for use in everyday lighting applications. Conventional LEDs cannot generate white light from their active layers; it must be produced from a combination of other colors. For example, blue emitting LEDs have been used to generate white light by surrounding the blue LED with a yellow phosphor, polymer or dye, with a typical phosphor being cerium-doped yttrium aluminum garnet (Ce:YAG). The surrounding phosphor material "down-converts" some of the blue light, changing its color to yellow. Some of the blue light passes through the phosphor without being changed while a substantial portion of the light is down-converted to yellow. The LED emits both blue and yellow light, which combine to provide a white light.

In another known approach light from a violet or ultraviolet emitting LED has been converted to white light by surrounding the LED with multicolor phosphors or dyes. Indeed, many other color combinations have been used to generate white light.

Because of the physical arrangement of the various source elements, multicolor sources often cast shadows with color separation and provide an output with poor color uniformity. For example, a source featuring blue and yellow sources may appear to have a blue tint when viewed head-on and a yellow tint when viewed from the side. Thus, one challenge associated with multicolor light sources is good spatial color mixing over the entire range of viewing angles.

One known approach to the problem of color mixing is to use a diffuser to scatter light from the various sources; however, a diffuser usually results in a wide beam angle. Diffusers may not be feasible where a narrow, more controllable directed beam is desired.

Another known method to improve color mixing is to reflect or bounce the light off of several surfaces before it is emitted. This has the effect of disassociating the emitted light from its initial emission angle. Uniformity typically improves with an increasing number of bounces, but each bounce has an associated loss. Many applications use intermediate diffusion mechanisms (e.g., formed diffusers and textured lenses) to mix the various colors of light. These devices are lossy and, thus, improve the color uniformity at the expense of the optical efficiency of the device.

Many modern lighting applications demand high power LEDs for increased brightness. High power LEDs can draw large currents, generating significant amounts of heat that must be managed. Many systems utilize heat sinks which must be in good thermal contact with the heat-generating light sources. Some applications rely on cooling techniques such as heat pipes which can be complicated and expensive.

Recent lighting luminaire designs have incorporated LEDs into lamp modules. There are several design challenges associated with the LED-based lamp modules including: source size, heat management, overall size of the lamp assembly, and the efficiency of the optic elements. Source size is important because the size of a 2pi emitter dictates the width of the output beam angle (i.e., etendue) using a standard aperture, such as a 2 inch (MR16) aperture, for example. Heat dissipation is a factor because, as noted above, the junction temperature of LEDs must be kept below a maximum temperature specified by the manufacturer to ensure optimal efficacy and lifetime of the LEDs. The overall size of the optical assembly is important because ANSI standards define the physical envelope into which a lamp must fit to ensure compliance with standard lighting fixtures. Lastly, the efficiency of the optic elements must be high so that the output from high-efficacy LEDs is not wasted on inefficient optics.

To address the issue of overall optical assembly size, total internal reflection (TIR) lenses have been used in lamp packages. However, TIR lenses typically exhibit poor efficiency, sometimes introducing losses of 30% or more as a tradeoff for their compact size.

SUMMARY OF THE INVENTION

An optical element according to one embodiment of the present invention comprises the following elements. A lens includes at least one total internal reflection (TIR) surface positioned to internally reflect incident light. The lens comprises a polymeric material having a refractive index of 1.6 or greater.

An optical element according to another embodiment of the present invention comprises the following elements. A lens includes a plurality of internal surfaces arranged to redirect light entering the lens at a receiving end toward a transmitting end. The lens comprises a material having a refractive index of 1.6 or greater.

An optical assembly according to an embodiment of the present invention comprises the following elements. A light source is disposed within a housing. A lens is arranged within the housing to receive a portion of the light emitted from the light source at a receiving end. The lens internally directs light from the light source toward a transmitting end. The lens comprises a material having a refractive index of 1.6 or greater.

An optical element according to an embodiment of the present invention comprises the following elements. A lens comprises at least one total internal reflection (TIR) surface positioned to internally reflect incident light and a receiving end that comprises a diffuser.

An optical assembly according to an embodiment of the present invention comprises the following elements. A lens is arranged to receive a portion of the light emitted from a light source at a receiving end. The lens internally directs light from the light source toward a transmitting end. A diffuser comprises a portion that is between the light source and the receiving end of the lens.

BRIEF DESCRIPTION OF THE DRAWINGS

FIG. 4 is a detailed cross-sectional view of the receiving end of an optical element according to an embodiment of the present invention.

FIG. 5 is a cross-sectional view of an optical element according to an embodiment of the present invention.

FIG. 6 is a cross-sectional view of an optical assembly according to an embodiment of the present invention.

DETAILED DESCRIPTION OF THE INVENTION

Embodiments of the present invention provide a compact optical element having at least one internal reflection surface that directs radiant energy (e.g., light) from a receiving end to a transmitting end. The optical element comprises a material having a refractive index (RI) higher than 1.5. Some suitable materials have refractive indices of 1.6 or higher. By using a high RI material, a lens can be fabricated that directs a greater portion of the light emitted from a source into the lens toward the transmitting end of the lens. Thus, less of the light spills out of the lens at a surface where emission is not intended, reducing the number of lossy bounces needed to direct the light in a particular direction.

It is understood that when an element is referred to as being "on" another element, it can be directly on the other element or intervening elements may also be present. Furthermore, relative terms such as "inner", "outer", "upper", "above", "lower", "beneath", and "below", and similar terms, may be used herein to describe a relationship of one element to another. It is understood that these terms are intended to encompass different orientations of the device in addition to the orientation depicted in the figures.

Although the ordinal terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present invention.

As used herein, the term "source" can be used to indicate a single light emitter or more than one light emitter functioning as a single source. For example, the term may be used to describe a single blue LED, or it may be used to describe a red LED and a green LED in proximity emitting as a single source. Thus, the term "source" should not be construed as a limitation indicating either a single-element or a multi-element configuration unless clearly stated otherwise.

The term "color" as used herein with reference to light is meant to describe light having a characteristic average wavelength; it is not meant to limit the light to a single wavelength. Thus, light of a particular color (e.g., green, red, blue, yellow, etc.) includes a range of wavelengths that are grouped around a particular average wavelength.

Figure 1:
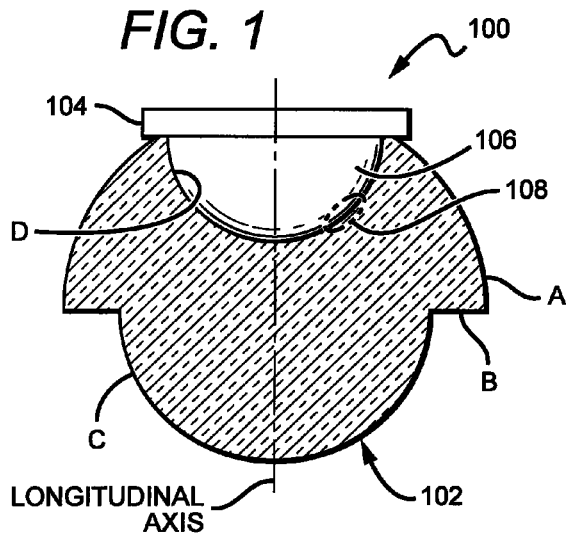
FIG. 1 is a cross-sectional view of an optical element according to an embodiment of the present invention.

FIG. 1 is a cross sectional view of an optical element 100 according to an embodiment of the present invention. This particular optical element 100 is designed to fit within a standard MR16 fixture. A lens 102 is disposed over a light source 104 and protective encapsulant 106. The lens 102 has a concave portion that cooperates with the encapsulant 106. A portion of the light that is emitted from the source 104 is transmitted through the encapsulant 106 into the lens 102 and finally into the ambient.

This particular lens 102 is symmetrical about a central longitudinal axis running through the center of the device. The lens is defined by three external surfaces A, B, C and one internal surface D. Surface A extends laterally and horizontally away from the portion of the lens 102 that is adjacent to the source 104. Surface B extends inward from surface A toward the longitudinal axis. Surface C extends from surface B away from the base of the lens 102. It is understood that lens 102 is an exemplary lens according to the present invention. Many other lens shapes are possible.

As shown in FIG. 1, a portion of the light emitted from the source 10 will be incident on surface A. Some of this light will strike the medium boundary at surface A at an angle that is greater than the critical angle. When this happens the light is only partially reflected back into the lens. That is, TIR is not achieved. The critical angle $\theta_c$ for a give medium boundary is defined by Snell's Law, which is given by the following equation:

$$\sin \theta_c = n_2/n_1$$

where $n_2$ is the refractive index of the ambient medium (e.g., n=1 for air) and $n_1$ is the refractive index of the lens material. From this equation, it is apparent that a higher index of refraction will yield a smaller critical angle. Thus, for lens materials having a higher refractive index, more of the light incident on the boundary will be experience TIR, providing for a more efficient optic.

For example, for a lens constructed from a typical material such as poly(methyl methacrylate) (PMMA) which has a refractive index of n=1.5, the critical angle is 41.81°. Any light that is incident on the lens surface at an angle that is greater than 41.81° from normal will experience TIR, and, consequently, any light that is incident at an angle that is less than 41.81° will only be partially internally reflected with a portion of the light exiting the lens and possibly being absorbed by lamp elements outside the lens. Thus, it is desirable to decrease the critical angle so that a greater percentage of the light emitted from the source experiences the TIR effect at surface A. This may be achieved by fabricating a lens from a high refractive index material.

Additionally, if a convex lens structure is used, such as surface C in lens 102, the lens power increases with higher refractive indices. This allows for a thinner lens (i.e., less convexity) for a similar output.

Embodiments of the present invention employ materials having a higher refractive index than materials that are typically used in TIR lenses. Suitable materials include those having a refractive index higher than n=1.5, with other acceptable materials having indices of refraction higher than n=1.6. Still other materials may have indices of refraction higher than n=1.7 or even n=2.0. As discussed previously, a higher refractive index will result in a lower critical angle at medium boundaries such as surface A. For example, the critical angle for a polycarbonate (PC) or PMMA lens where n=1.8 would be 33.75°; for n=2.0, the critical angle would be 30.0°. Some lens materials that may be used include various polymeric materials such as PMMAs, PCs, cyclic olyphan copolymers (COC), or various types of glass. Other materials may also be used.

Light source 104 can comprise a single emitter or multiple emitters. In multiple emitter embodiments, the emitters can be the same color or different colors. When multiple emitters are used, it is desirable to blend the output of the individual emitters so that it appears that the light is coming from a single "virtual" source. This can be done in various ways.

For example, in some embodiments an index matching material can be used between the encapsulant 106 and the lens 102 to ease transition between the two materials which may have significantly different refractive indices. Index matching materials are typically viscous curable fluids, such as epoxies for example, that can be coated onto a surface or injected into a cavity between two surfaces. Once cured, the material provides an intermediate step up/down in refractive index as the light passes from a first medium through the index matching material and into a second medium. Many different known index matching materials may be used.

In other embodiments, in order to blend the light output of multiple sources, a diffuser may be used. The diffuser can be disposed on any surface of the lens 102 or within the lens 102. In the embodiment shown in FIG. 1, a diffuser 108 is disposed on surface D of the lens 102. The diffuser 108 can have different structures to diffuse the incident light. In one embodiment, the diffuser 108 comprises a plurality of surface structures such as those shown in FIG. 2. In another embodiment, the diffuser comprises a volumetric film which is applied to the lens surface D. These diffuser structures are discussed in more detail below.

The incident light impinges the diffuser 108 on surface D and refracts to give the desired spread inside the lens 102. Diffusers having different specifications can be used to achieve a particular angular spectrum. The specifications of the diffuser 108 may be chosen such that the light entering the lens 102 is directed toward surfaces C, ensuring that a maximum portion of the light is internally reflected toward surfaces A and B for emission from the lens 102.

Figure 2:
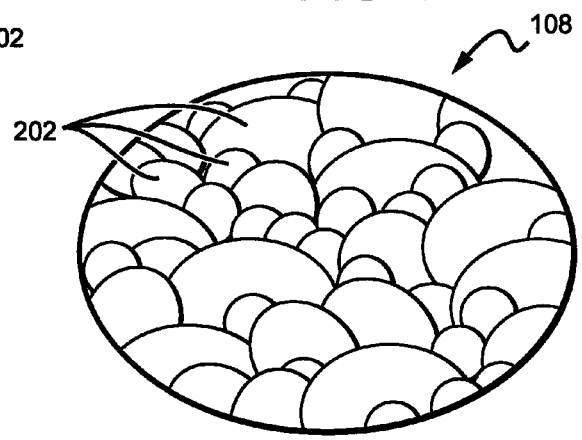
FIG. 2 is a magnified view of diffusive surface structures that may be used on surfaces of optical elements according to embodiments of the present invention.

FIG. 2 shows a magnified view of surface structures 202 which may be used as a diffuser in embodiments of the present invention. As shown in FIG. 1, the surface structures may be disposed on surface D of the lens 102. In other embodiments, the diffuser 108 may comprise a volumetric film. Because the diffractive elements cannot be scratched off the surface, volumetric films may provide a more robust diffuser. Diffusers may be applied to the lens surfaces using a variety of known additive or subtractive techniques, including spray-on techniques, for example.

In some embodiments, it may be desirable to convert a portion of the light emitted from the source(s) to another wavelength. Thus, the optical element 100 may emit a combination of wavelengths which combine to produce a particular output color. Several known conversion schemes may be used to produce white light which is necessary for many commercial, residential, and industrial applications. One such scheme converts light from blue LEDs to yellow in a ratio that yields a white light output. The wavelength conversion material can either be disposed within or on the emitter itself (e.g., as an LED chip-level feature) or it can be disposed remotely, such as on surface D, for example. Remote phosphor layers or regions may also be disposed within the lens 102.

In various embodiments the conversion material can comprise one or multiple conversion materials, such as phosphors. Thermal paths can be included for heat to dissipate from the conversion material during operation while at the same time keeping the conversion material remote to the light source so that most or all of the heat from the light source does not pass into the conversion material, and the local density of excitation photons incident of the phosphor layer is reduced. This allows the remote conversion material to operate with a lower temperature and reduced photon excitation density compared to conversion materials lacking thermally conductive paths to dissipate conversion heat.

By being remote and remaining relatively cool, the conversion material can operate more efficiently and does not suffer the heat related color shift. Operating at lower temperatures also reduces heat related degradation of the conversion material and can increase the long term reliability of the conversion material. Remote arrangements can also allow the conversion material to operate with lower excitation density which can reduce the likelihood that the phosphor will be optically saturated by incident light from the light source.

The light source is arranged so that at least some of its emitted light passes through the phosphor, with at least some of the light from the light source converted by the phosphor. In some embodiments this conversion includes photon down-conversion wherein the wavelength of the converted light is longer than the light source light. In other embodiments this conversion can comprise up-conversion wherein the wavelength of the converted light is shorter than the light source light. In either case, the conversion can cause heat to be generated in the phosphor from the conversion process. Various features may be used to dissipate the heat to the ambient. Good thermal management allows the remote phosphor layer to maintain a lower operating temperature leading to the benefits mentioned above.

As further described below, the optical assemblies according to embodiments of the present invention can be arranged in many different ways. In some embodiments the light sources can comprise solid state light sources, such as different types of LEDs, LED chips or LED packages with different lens or optic arrangements. In other embodiments a single LED chip or package can be used, while in others multiple LED chips or packages can be used and arranged in different types of arrays. By having the phosphor thermally isolated from LED chips, the LED chips can be driven by higher current levels without causing detrimental effects to the conversion efficiency of the phosphor and its long term reliability. This can allow for the flexibility to overdrive the LED chips so that a lower the number of LEDs can be used to produce the desired luminous flux, which in turn can reduce the cost and/or the complexity of the lamps. These LED packages can also comprise LEDs encapsulated with a material that can withstand the elevated luminous flux or can comprise unencapsulated LEDs.

In some embodiments the light source 104 can comprise one or more blue emitting LEDs, and the phosphor can comprise one or more materials that absorb a portion of the blue light and emit one or more different wavelengths of light such that the lamp emits a white light combination from the blue LED and the conversion material. The conversion material can absorb the blue LED light and emit different colors of light including but not limited to yellow and green. The light source 104 can also comprise different LEDs and conversion materials emitting different colors of light so that the lamp emits light with the desired characteristics such as color temperature and color rendering, for example.

For some applications, it may be desirable (in order to meet specific requirements of color point, color temperature, and/or color rendering) to have some portion of the light emitted by the light source and/or phosphor layer comprise essentially red light. Conventional lamps incorporating both red and blue LEDs chips can be subject to color instability with different operating temperatures and dimming. This can be due to the different behaviors of red and blue LEDs at different temperatures and operating powers (current/voltage) as well as different operating characteristics over time. Embodiments according to the present invention can address this issue by having a light source with the same type of emitters in combination with a remote phosphor that can comprise multiple types or layers and/or regions of phosphors that remain relatively cool through the thermal dissipation arrangements disclosed herein. The remote phosphor can absorb light from the emitters and can re-emit different colors of light, including red light, while still experiencing the efficiency and reliability of reduced operating temperature for the phosphors.

The separation of the phosphor elements from the LEDs provides the added advantage of easier and more consistent color binning. This can be achieved in a number of ways. LEDs from various bins (e.g. blue LEDs from various bins) can be assembled together to achieve substantially uniform excitation sources that can be used in different lamps. These can then be combined with phosphor carriers having substantially the same conversion characteristics to provide lamps emitting light within the desired bin. In addition, numerous phosphors can be manufactured and pre-binned according to their different conversion characteristics. Different phosphors can be combined with light sources emitting different characteristics to provide a lamp emitting light within a target color bin.

As noted above, the phosphor layer can also be arranged with more than one phosphor either mixed in the phosphor layer or as separate layers/regions. In some embodiments, each of the two phosphors can absorb the LED light and can re-emit different colors of light. In these embodiments, the colors from the two phosphor layers can be combined for higher CRI white of different white hue (warm white). This can include light from yellow phosphors above that can be combined with light from red phosphors. Different red phosphors can be used including:

$Sr_xCa_{1-x}S$:Eu, Y; Y=halide;
$CaSiAlN_3$:Eu; or
$Sr_{2-y}Ca_ySiO_4$:Eu.

Other phosphors can be used to create color emission by converting substantially all light to a particular color. For example, the following phosphors can be used to generate green light:

$SrGa_2S_4$:Eu;
$Sr_{2-y}Ba_ySiO_4$: Eu; or
$SrSi_2O_2N_2$: Eu.

The following lists some additional suitable phosphors used as conversion particles, although others can be used. Each exhibits excitation in the blue and/or UV emission spectrum, provides a desirable peak emission, has efficient light conversion, and has acceptable Stokes shift:

Yellow/Green
(Sr, Ca, Ba) $(Al, Ga)_2S_4$:$Eu^{2+}$
$Ba_2$ (Mg, Zn) $Si_2O_7$: $Eu^{2+}$
$Gd_{0.46}Sr_{0.31}Al_{1.23}O_xF_{1.38}$: $Eu^{2+}_{0.06}$
$(Ba_{1-x-y}Sr_xCa_y) SiO_4$: Eu
$Ba_2SiO_4$: $Eu^{2+}$ Red
$Lu_2O_3$: $Eu^{3+}$
$(Sr_{2-x}La_x) (Ce_{1-x}Eu_x) O_4$
$Sr_2Ce_{1-x}Eu_xO_4$
$Sr_{2-x}Eu_xCeO_4$
$SrTiO_3$: $Pr^{3+}$, $Ga^{3+}$
$CaAlSiN_3$: $Eu^{2+}$
$Sr_2Si_5N_8$: $Eu^{2+}$ Different sized phosphor particles can be used including but not limited to particles in the range of 10 nanometers (nm) to 30 micrometers (μm), or larger. Smaller particle sizes typically scatter and mix colors better than larger sized particles to provide a more uniform light. Larger particles are typically more efficient at converting light compared to smaller particles, but emit a less uniform light. In some embodiments, the phosphor can be provided in the phosphor layer in a binder, and the phosphor can also have different concentrations or loading of phosphor materials in the binder, a typical concentration being in a range of 30-70% by weight. In one embodiment, the phosphor concentration is approximately 65% by weight, and is preferably uniformly dispersed throughout the remote phosphor. The phosphor layer can also have different regions with different conversion materials and different concentrations of conversion material.

Figure 3:
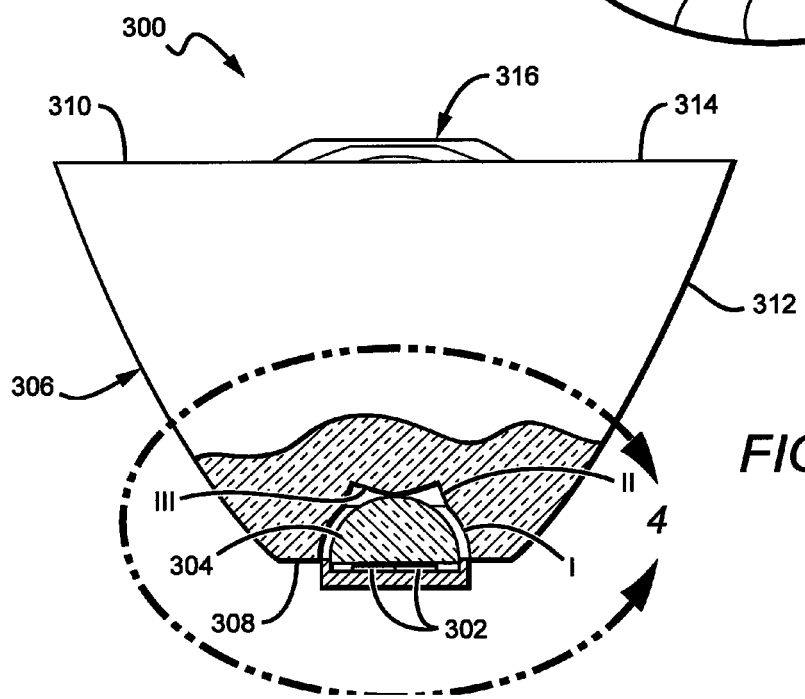
FIG. 3 is a cross-sectional view of an optical element according to an embodiment of the present invention.

Embodiments of the present invention can be incorporated into several different types of optical elements, including TIR lens designs. FIG. 3 is a cross-sectional view of an optical element 300 according to an embodiment of the present invention. This particular embodiment comprises multiple light sources 302 under a hemispherical encapsulant 304. It is understood that many different shapes of encapsulants may be used, such as flat encapsulant, for example. A lens 306 is disposed over the encapsulant 304 to shape the light into a desired output pattern. As shown, there may be a gap between the encapsulant 304 and the lens 306. The gap may be filled with air or another filler material such as an index matching fluid, for example. An index matching fluid may be used to facilitate the transition between materials having different refractive indices. In other embodiments, the lens may be formed to fit snugly over the encapsulant such that the two elements abut one another. In this case, the gap between the materials is minimized.

The lens 306 comprises a receiving end 308 and a transmitting end 310. Light emitted from the sources 302 exits the encapsulant 304 and enters the lens 306 at the receiving end 308 and is emitted at the transmitting end 310.

FIG. 4 is a detailed view of the receiving end 308 of the optical element 300. The receiving end 308 can comprise one or more zones. In the embodiment shown, the receiving end has three distinct surfaces which define zones I, II, III. Each zone is designed to direct light incident on that zone in a certain direction toward the transmitting end 310. The zones can be shaped in many different ways to provide the desired effect at that interface. For example, the zones can be hemispheric, hyperbolic, inverse parabolic, or conic; however, many other shapes are possible. In this exemplary embodiment zone I is hemispheric, zone II is defined by a truncated cone, and zone III is defined by a slightly parabolic inverse cone.

A portion of the light incident on the zones is directed toward a side surface 312 of the lens at an angle that will allow the light to be internally reflected toward the transmitting end 310. Another portion of the light is directed toward the center of the transmitting end 310 where it will interact with the transmitting end zones.

In the embodiment shown in FIG. 3, the transmitting end 310 comprises multiple distinct zones. A flat zone 314 is positioned around the periphery of the transmitting end 310 with a Fresnel-type surface in the center. The Fresnel zone 316 reduces internal reflection at the emission surface and collimates the light as it is emitted. Many other geometric structures may be used as zones on the transmitting end 310. For example, FIG. 5 illustrates a TIR lens 500 according to an embodiment of the present invention. The lens 500 is similar to lens 300 in many respects; however, instead of a Fresnel zone at the transmission end, lens 500 comprises a hemispherical exit zone 502. In other embodiments, exit zones may be designed differently to achieve a desired output profile.

Figure 7:
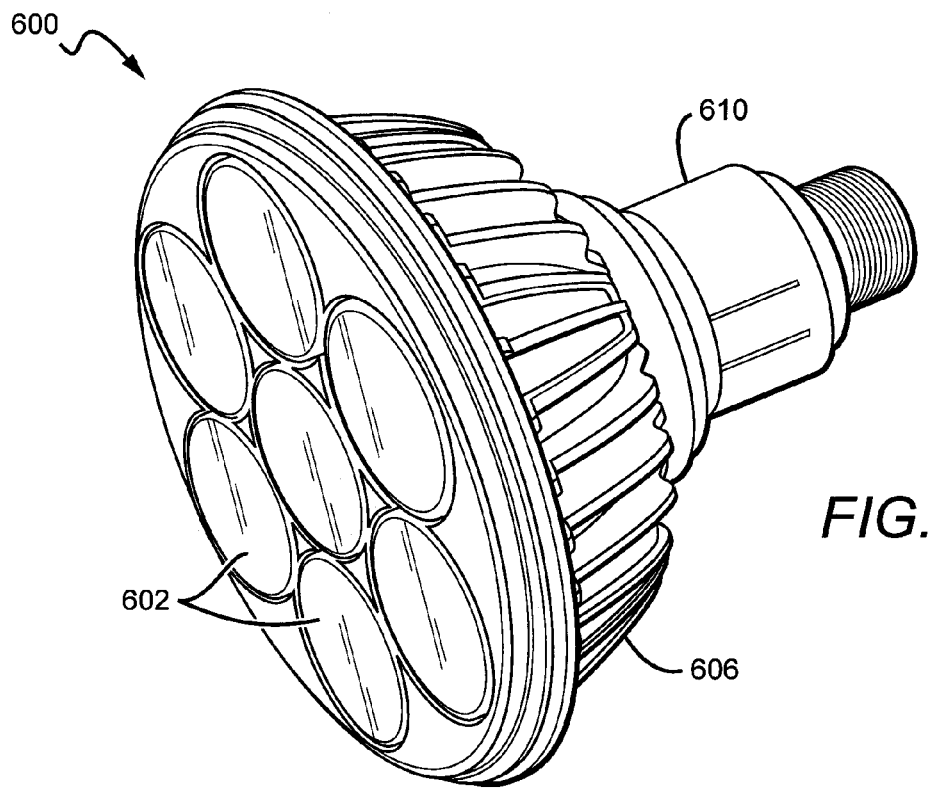
FIG. 7 is a perspective view of an optical assembly according to an embodiment of the present invention.

TIR lenses similar to those shown in FIG. 3 and FIG. 5 may be incorporated into optical assemblies such as lamps, fixtures, or luminaires. FIG. 6 is a cross-sectional view of an optical assembly 600 according to an embodiment of the present invention. In this particular embodiment, seven TIR lenses 602 are positioned over light sources 604 each of which are mounted within a protective housing 606. FIG. 7 is a perspective view of the optical assembly 600, showing the placement of the seven lenses 602. The lenses 602 cooperate with encapsulants 608 which cover and protect the individual emitters as discussed above. Each source 604 may comprise one or more emitter chips which can emit the same or different colors. The encapsulants can be designed to function as diffusers or wavelength converters.

The protective housing 606 surrounds the lenses 604 and the sources 604 to shield these internal components from the elements. A lens plate (not shown) may be placed over the lenses 604 at the open end of the housing 606. The lens plate and the housing 606 may form a watertight seal to keep moisture from entering into the internal areas of the device 600. A portion of the housing 606 may comprise a material that is a good thermal conductor, such as aluminum or copper. The thermally conductive portion of the housing 606 can function as a heat sink by providing a path for heat from the sources 604 through the housing 606 into the ambient. In some embodiments the housing 606 can comprise heat dissipating features such as fins or heat pipes. In other embodiments the housing 606 can comprise different types of lamp collars that can be mounted to a different feature such as a separate heat sink. The sources 604 are disposed at the base of the housing 606 in good thermal contact with the sources 604. Thus, the sources 604 may comprise high power LEDs that generate large amounts of heat.

Power is delivered to the sources 604 through a protective conduit 610. The lamp device 600 may be powered by a remote source connected with wires running through the conduit 610, or it may be powered internally with a battery that is housed within the conduit 610. The conduit 610 may be threaded as shown in FIG. 7 for mounting to an external structure. In one embodiment, an Edison screw shell may be attached to the threaded end to enable the lamp 600 to be used in a standard Edison socket. Other embodiments can include custom connectors such as a GU24 style connector, for example, to bring AC power into the lamp 600. The device may also be mounted to an external structure in other ways.

The conduit 610 functions not only as a structural element, but may also provide electrical isolation for the high voltage circuitry that it houses which helps to prevent shock during installation, adjustment and replacement. The conduit 610 may comprise an insulative and flame retardant thermoplastic or ceramic, although other materials may be used.

Figure 8:
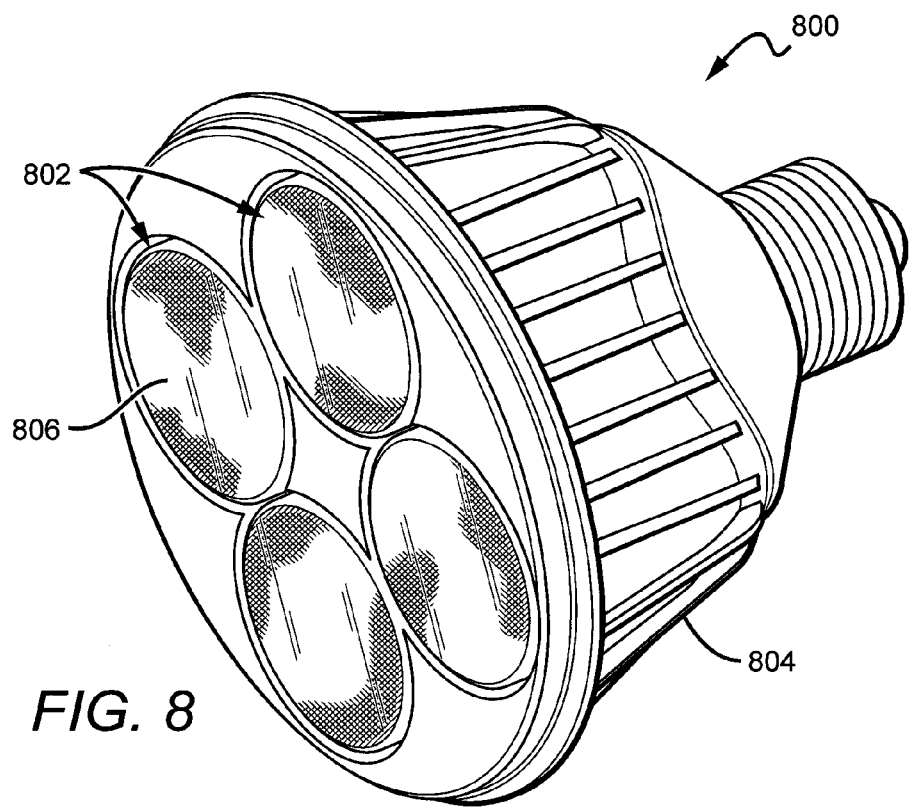
FIG. 8 is a perspective view of an optical assembly according to an embodiment of the present invention.

FIG. 8 is a perspective view of another optical assembly 800 according to an embodiment of the present invention. The assembly 800 is similar to the optical assembly 600, but instead of seven lens/source pairs, it comprises four lenses 802 arranged symmetrically about a longitudinal axis. The housing 804 is shaped to accommodate the four lenses 802 as shown. The emission surfaces 806 of the lenses 802 are textured. A textured structure on the lens surfaces 806 can serve several functions. For example, depending on the design, the textured surface can reduce internal reflection, diffuse the emitted light to improve spatial color mixing, or redirect the light to affect the beam shape. The surface textures may be irregular or regular (e.g., a Fresnel-type surface).

It is understood that additional known optical elements may be added to the lenses and optical assemblies disclosed herein without departing from the scope of the invention. For example, embodiments of the optical assembly may include various combinations of wavelength conversion structures and diffuser structures. Additionally, various lens and reflector components may also be used to achieve a particular output beam profile. Such combinations are within the scope of the disclosure.

Although the present invention has been described in detail with reference to certain embodiments thereof, other versions are possible. Therefore, the spirit and scope of the invention should not be limited to the versions described above.

I claim:

1. An optical element, comprising:
a lens comprising at least one total internal reflection (TIR) surface positioned to internally reflect incident light, said lens further comprising a receiving end with a diffuser;
wherein said lens comprises a polymeric material having a refractive index of 1.6 or greater.

2. The optical element of claim 1, said polymeric material having a refractive index of 1.7 or greater.

3. The optical element of claim 1, said polymeric material having a refractive index of 1.8 or greater.

4. The optical element of claim 1, wherein said lens is symmetrical about a longitudinal axis running through the center of said lens.

5. The optical element of claim 1, said at least one TIR surface having a conical shape.

6. The optical element of claim 1, said at least one TIR surface having an elliptical shape.

7. The optical element of claim 1, said at least one TIR surface having a parabolic shape.

8. The optical element of claim 1, wherein said receiving end comprises at least one zone and said lens further comprises a transmitting end comprising at least one zone.

9. The optical element of claim 8, said at least one receiving end zone having a shape characterized as hemispheric, hyperbolic, inverse parabolic, or conic.

10. The optical element of claim 1, said receiving end comprising at least two zones having, each of said zones having a shape characterized as hemispheric, hyperbolic, inverse parabolic, or conic.

11. The optical element of claim 8, said at least one transmitting end zone having a flat shape.

12. The optical element of claim 8, said at least one transmitting end zone having a dome shape.

13. The optical element of claim 8, said at least one transmitting end zone comprising a Fresnel lens.

14. The optical element of claim 8, said transmitting end comprising a plurality of zones.

15. The optical element of claim 8, said transmitting end comprising a disperser.

16. The optical element of claim 8, said transmitting end comprising a plurality of lenslets.

17. The optical element of claim 8, said transmitting end comprising a diffractive element.

18. The optical element of claim 1, said diffuser comprising surface elements.

19. The optical element of claim 1, said diffuser comprising a volumetric film.

20. The optical element of claim 1, further comprising a wavelength conversion material on a surface of or internal to said optical element.

21. An optical element, comprising:
a lens comprising a plurality of internal surfaces arranged to redirect light entering said lens at a receiving end toward a transmitting end, wherein said receiving end comprises a diffuser;

wherein said lens comprises a material having a refractive index of 1.6 or greater.

22. The optical element of claim 21, said lens comprising a polymer.

23. The optical element of claim 21, said lens comprising poly(methyl methacrylate) (PMMA).

24. The optical element of claim 21, said lens comprising a polycarbonate.

25. The optical element of claim 21, said lens comprising a cyclic olefin copolymer (COC).

26. The optical element of claim 21, said diffuser comprising surface elements on an inner surface of said lens.

27. The optical element of claim 21, said diffuser comprising a diffusive volumetric film on said inner surface.

28. The optical element of claim 21, further comprising a wavelength conversion material on a surface of said lens.

29. An optical assembly, comprising:
a housing;
a light source within said housing;
a lens within said housing arranged to receive a portion of the light emitted from said light source at a receiving end, said lens internally directing light from said light source toward a transmitting end, wherein said receiving end comprises a diffuser;
wherein said lens comprises a material having a refractive index of 1.6 or greater.

30. The optical assembly of claim 29, said lens comprising a polymer.

31. The optical assembly of claim 29, said lens comprising poly(methyl methacrylate) (PMMA).

32. The optical element of claim 29, said lens comprising a polycarbonate.

33. The optical element of claim 29, said lens comprising a cyclic olefin copolymer (COC).

34. The optical assembly of claim 29, said diffuser comprising surface elements on a surface of said lens.

35. The optical assembly of claim 29, said diffuser comprising a diffusive volumetric film on a surface of said lens.

36. The optical assembly of claim 29, said optical assembly further comprising a wavelength conversion material on said inner surface of or internal to said lens.

37. The optical assembly of claim 29, said light source comprising multiple solid state emitters.

38. The optical assembly of claim 29, said light source comprising multiple light emitting diodes (LEDs).

39. The optical assembly of claim 29, said light source comprising at least two light sources emitting different spectra.

40. The optical assembly of claim 29, wherein said housing comprises a thermally conductive component in thermal contact with said light source to draw heat away from said light source.

41. An optical element, comprising:
a lens comprising at least one total internal reflection (TIR) surface positioned to internally reflect incident light and a receiving end that comprises a diffuser.

42. The optical element of claim 41, wherein said lens comprises a polymeric material having a refractive index of b 1.6 or greater.

43. The optical element of claim 41, said diffuser comprising surface elements.

44. The optical element of claim 41, said diffuser comprising a volumetric film.

45. The optical element of claim 41, further comprising a wavelength conversion material on a surface of or internal to said optical element.

46. An optical assembly comprising:
a light source;
a lens arranged to receive a portion of the light emitted from said light source at a receiving end, said lens internally directing light from said light source toward a transmitting end; and
a diffuser comprising a portion that is between said light source and said receiving end of said lens.

47. The optical element of claim 46, wherein said lens comprises a polymeric material having a refractive index of 1.6 or greater.

48. The optical element of claim 46, wherein said lens comprises a polymeric material having a refractive index of 1.7 or greater.

49. The optical element of claim 46, wherein said lens comprises a polymeric material having a refractive index of 1.8 or greater.

50. The optical element of claim 46, said diffuser comprising surface elements.

51. The optical element of claim 46, said diffuser comprising a volumetric film.

* * * * *